United States Patent
Nagamine et al.

(10) Patent No.: US 8,755,714 B2
(45) Date of Patent: *Jun. 17, 2014

(54) CHARGING MEMBER, PROCESS CARTRIDGE AND ELECTROPHOTOGRAPHIC APPARATUS

(75) Inventors: Noriko Nagamine, Suntou-gun (JP); Noriaki Kuroda, Suntou-gun (JP); Yuya Tomomizu, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,098

(22) Filed: Feb. 8, 2012

(65) Prior Publication Data

US 2012/0141159 A1    Jun. 7, 2012

Related U.S. Application Data

(63) Continuation of application No. PCT/JP2011/005143, filed on Sep. 13, 2011.

(30) Foreign Application Priority Data

Sep. 27, 2010    (JP) .................................. 2010-215808

(51) Int. Cl.
    G03G 15/02    (2006.01)
(52) U.S. Cl.
    USPC ........... 399/111; 399/168; 399/176; 428/446; 428/447; 428/451
(58) Field of Classification Search
    USPC ........... 399/111, 168, 176; 428/446, 447, 451
    See application file for complete search history.

(56) References Cited

U.S. PATENT DOCUMENTS

| 5,576,805 A | 11/1996 | Ishihara et al. |
| 7,693,457 B2 | 4/2010 | Kuruma et al. |
| 7,962,068 B2 | 6/2011 | Kuroda et al. |
| 8,064,803 B2 | 11/2011 | Kuroda et al. |

(Continued)

FOREIGN PATENT DOCUMENTS

| JP | 8-44151 A | 2/1996 |
| JP | 8-179591 A | 7/1996 |

(Continued)

OTHER PUBLICATIONS

Kuroda, et al., U.S. Appl. No. 13/369,105, filed Feb. 8, 2012.

(Continued)

*Primary Examiner* — D. S. Nakarani
(74) *Attorney, Agent, or Firm* — Fitzpatrick, Cella, Harper and Scinto

(57) ABSTRACT

A charging member is provided with a surface layer that can not easily wear even due to its contact with a photosensitive member and also has an appropriate elasticity contributing to the formation of an appropriate nip between it and the photosensitive member. The charging member has a substrate, an elastic layer and a surface layer; the surface layer containing a high-molecular compound having an Si—O—Hf linkage and having a constitutional unit represented by the formula (1) and a constitutional unit represented by the formula (2):

$$\left(\begin{array}{cc} R_1-O-R_2-O \\ | & | \\ SiO_{3/2} & SiO_{3/2} \end{array}\right) \quad (1)$$

$$HfO_{4/2}. \quad (2)$$

7 Claims, 5 Drawing Sheets

(56) References Cited

U.S. PATENT DOCUMENTS

| | | |
|---|---|---|
| 8,092,358 B2 | 1/2012 | Kuruma et al. |
| 2010/0226684 A1 | 9/2010 | Mayuzumi et al. |
| 2011/0182618 A1 | 7/2011 | Kuruma et al. |
| 2011/0217072 A1 | 9/2011 | Kuroda et al. |
| 2012/0076535 A1 | 3/2012 | Nagamine et al. |
| 2012/0076924 A1 | 3/2012 | Mayuzumi et al. |
| 2012/0082481 A1 | 4/2012 | Nagamine et al. |
| 2012/0093539 A1 | 4/2012 | Nagamine et al. |
| 2012/0107565 A1 | 5/2012 | Kuroda et al. |
| 2012/0121296 A1 | 5/2012 | Kuroda et al. |

FOREIGN PATENT DOCUMENTS

| | | |
|---|---|---|
| JP | 8-248733 A | 9/1996 |
| JP | 8-314233 A | 11/1996 |
| JP | 2001-305832 A | 11/2001 |
| JP | 2004-20844 A | 1/2004 |
| JP | 2009-151159 A | 7/2009 |
| JP | 2009-151160 A | 7/2009 |

OTHER PUBLICATIONS

Tomomizu, et al., U.S. Appl. No. 13/371,200, filed Feb. 10, 2012.
English translation of International Preliminary Report on Patentability, International Application No. PCT/JP2011/005143, Mailing Date Apr. 25, 2013.

CHARGING MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2011/005143, filed Sep. 13, 2011, which claims the benefit of Japanese Patent Application No. 2010-215808, filed Sep. 27, 2010.

BACKGROUND OF THE INVENTION

1. Field of the Invention

This invention relates to a charging member and a process cartridge making use of the same.

2. Description of the Related Art

As a charging member used for contact charging of an electrophotographic photosensitive member, a charging member having a support, a conductive elastic layer provided on the support and an insulative surface layer provided on the conductive elastic layer is in wide use.

Now, the charging member used in such a contact charging system is kept in contact with the photosensitive member, and hence the former's surface may be scraped by any toners, external additives and so forth which remain on the surface of the photosensitive member, so that the toners and toner external additives come to tend to stick to the part having been scrapped. Such a charging member to which the toners and external additives have come to stick partly may cause non-uniform charging on the photosensitive member.

The surface layer may also stand low in electrical resistance at its part having worn, and hence, when the photosensitive member is electrostatically charged by using a charging member having the part having worn, any discharge may localize at that part having worn, to make the surface of the photosensitive member deteriorate as a result thereof.

For such problems, Japanese Patent Application Laid-open No. H08-179591 discloses a method in which an empty space is kept between a charging member and a photosensitive member by providing the former at its each end portion with a spacer member so as to be discharged there. Japanese Patent Application Laid-open No. 2004-020844 also discloses a method in which charge accelerating particles are used to make the surface of a charging member always wear so as to effect stable charging.

Japanese Patent Application Laid-open No. H08-314233 further discloses that a film of urethane resin containing an epichlorohydrin-ethylene oxide copolymer in a proportion of 40% by mass or less has, a high wear resistance and the use of such a film in a charging roller brings an improvement in durability (running performance) of the charging roller.

SUMMARY OF THE INVENTION

However, according to studies made by the present inventors, the method according to Japanese Patent Application Laid-open No. H08-179591 can keep the photosensitive member and the charging member from wearing because the both are not in contact with each other, but has been found to have difficulty in some cases in keeping the empty space. The method according to Japanese Patent Application Laid-open No. 2004-020844 has been found to have difficulty in some cases in making the charging member always wear and charging the photosensitive member constantly and uniformly. Further, the film according to Japanese Patent Application Laid-open No. H08-314233 has been found to leave room for more improvement in wear resistance.

Accordingly, the present invention is directed to providing a charging member provided with a surface layer that can not easily wear even due to its contact with the photosensitive member and also has an appropriate elasticity contributing to the formation of an appropriate nip between it and the photosensitive member.

The present invention is also directed to providing a process cartridge and an electrophotographic apparatus which enable formation of high-quality electrophotographic images over a long period of time.

According to one aspect of the present invention, there is provided a charging member, comprising: a substrate; an elastic layer; and a surface layer, wherein: the surface layer comprises a high-molecular compound having an Si—O—Hf linkage; and the high-molecular compound has a constitutional unit represented by the following formula (1) and a constitutional unit represented by the following formula (2):

In the formula (1), $R_1$ and $R_2$ each independently represent any of structures represented by the following formulae (3) to (6).

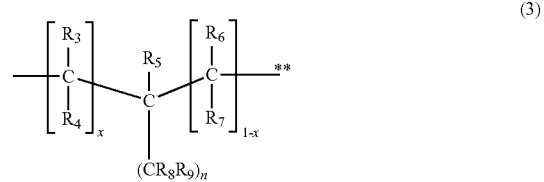

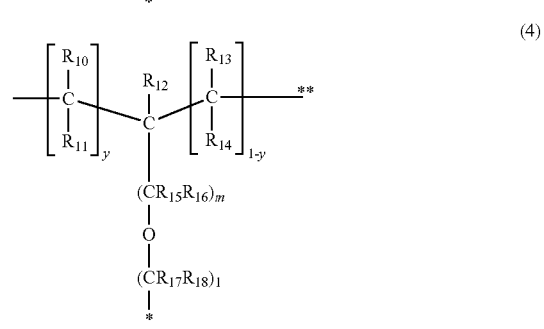

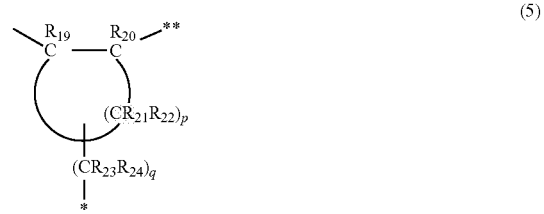

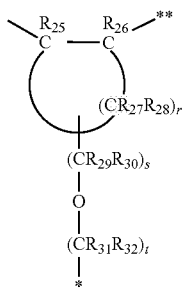

(6)

In the formulae (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group having 1 to 4 carbon atom(s) or an alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * represents the position of bonding with the silicon atom in the formula (1) and a double asterisk ** represents the position of bonding with the oxygen atom in the formula (1).

According to another aspect of the present invention, there is provided an electrophotographic apparatus, comprising: an electrophotographic photosensitive member; and the afore-mentioned charging member which is disposed in contact with the electrophotographic photosensitive member.

According to further aspect of the present invention, there is provided a process cartridge comprising: an electrophotographic photosensitive member; and the afore-mentioned charging member which is disposed in contact with the electrophotographic photosensitive member, wherein the process cartridge is formed to be detachably mountable to a main body of an electrophotographic apparatus.

According to the present invention, it can obtain a charging member provided with a surface layer which can not easily wear even due to its contact with the photosensitive member and also has an appropriate elasticity contributing to the formation of a stable nip between it and the photosensitive member. According to the present invention, it can also obtain a process cartridge and an electrophotographic apparatus which enable stable formation of high-grade images.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
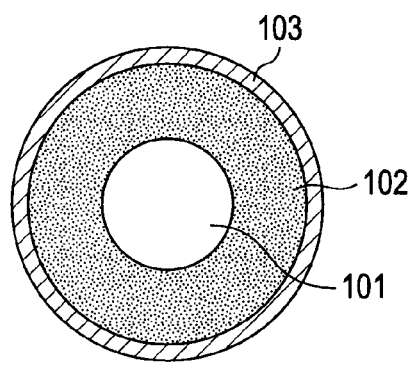
FIG. 1 is a sectional view showing an example of the charging member of the present invention.

The charging member of the present invention has a substrate, an elastic layer and a surface layer. As an example thereof, a charging roller shown in FIG. 1 has a substrate 101, and a conductive elastic layer 102 and a surface layer 103 which are layered thereon in this order.

Substrate:

As a material for the substrate, a metal or an alloy thereof may be used, such as iron, copper, stainless steel, aluminum or nickel.

Elastic Layer:

The elastic layer is one providing the charging member with elasticity and electrical conductivity; the former being that which enables formation of a nip zone between it and the photosensitive member. The elastic layer may be formed using a rubber or a thermoplastic elastomer, any of which may be used alone or in combination of two or more types.

Such a rubber may include, e.g., the following: Urethane rubbers, silicone rubbers, butadiene rubbers, isoprene rubbers, chloroprene rubbers, styrene-butadiene rubbers, ethylene-propylene rubbers, polynorbornene rubbers, styrene-butadiene-styrene rubbers, acrylonitrile rubbers, epichlorohydrin rubbers and alkyl ether rubbers.

The thermoplastic elastomer may also include, e.g., styrene type elastomers and olefin type elastomers. Commercially available products of the styrene type elastomers may include, e.g., RABARON, trade name, available from Mitsubishi Chemical Corporation; and SEPTON COMPOUND, trade name, available from Kuraray Co., Ltd. Commercially available products of the olefin type elastomers may include, e.g., THERMOLAN, trade name, available from Mitsubishi Chemical Corporation; MILASTOMER, trade name, available from Mitsui Petrochemical Industries, Ltd.; SUMITOMO TPE, trade name, available from Sumitomo Chemical Co., Ltd.; and SANTOPRENE, trade name, available from Advanced Elastomer Systems, L.P.A. Any of these may be used alone or in combination of two or more types.

A conducting agent may also be used in the elastic layer in order to provide it with electrical conductivity, and may include, e.g., cationic surface-active agents, anionic surface-active agents, amphoteric surface-active agents, antistatic agents and electrolytes.

The cationic surface-active agents may specifically include salts of the following quaternary ammoniums: Lauryltrimethylammonium, stearyltrimethylammonium, octadodecyltrimethylammonium, dodecyltrimethylammonium, hexadecyltrimethylammonium, and modified fatty acid dimethylethylammonium. The salts for the quaternary ammoniums may include perchlorates, chlorates, tetrafluoroborates, ethosulfates and benzyl halides (such as benzyl bromide and benzyl chloride).

The anionic surface-active agents may include aliphatic sulfonates, higher alcohol sulfates, higher alcohol ethylene oxide addition sulfates, higher alcohol phosphates, and higher alcohol ethylene oxide addition phosphates.

The antistatic agents may include higher alcohol ethylene oxides, and the electrolytes may include salts (such as quaternary ammonium salts) of metals belonging to Group 1 of the periodic table (such as Li, Na and K). As the conducting agent for the elastic layer, also usable are salts (such as $Ca(ClO_4)_2$) of metals belonging to Group 2 of the periodic table (such as Ca and Ba), and antistatic agents derived therefrom.

As the conducting agent for the elastic layer, further usable are the following: Carbon black; graphites such as natural graphite and artificial graphite; metal oxides such as tin oxide, titanium oxide and zinc oxide; metals such as nickel, copper, silver and germanium; and conductive polymers such as polyaniline, polypyrrole and polyacetylene.

Any of these conducting agents may be used alone or in combination of two or more types. Any of these conducting agents may be in any content in the elastic layer without any particular limitations as long as the charging member can be provided with the desired electrical conductivity. For example, a content may be selected which makes the elastic layer have an electrical resistance of from $10^2 \Omega$ or more to $10^8$ {fourth root} or less, and preferably from $10^3 \Omega$ or more to $10^6 \Omega$ or less.

The value of electrical resistance may be calculated from the value of electric current measured when a roller obtained by forming the elastic layer on a conductive mandrel is brought into contact with a cylindrical metal drum and a DC voltage of 100 V is applied across the mandrel and the drum while being rotated.

An inorganic or organic filler and a cross-linking agent may further be contained in the elastic layer.

The elastic layer may preferably have an Asker-C hardness of 60 degrees or more to 85 degrees or less, and particularly from 70 degrees or more to 80 degrees or less, from the viewpoint of keeping the charging member from deforming when the charging member and the photosensitive member are brought into contact with each other. The Asker-C hardness may be evaluated by measuring it under conditions of a load of 1,000 g, bringing a loaded needle of an Asker-C hardness meter (manufactured by Koubunshi Keiki Co., Ltd.) into touch with the surface of the measuring object.

Such an elastic layer may be formed by shaping or molding an unvulcanized rubber composition by a method such as extrusion or injection molding, followed by vulcanization with heating. Thereafter, the product may optionally be worked by cutting so as to be preferably made into what is called a crown shape in which the elastic layer is larger in thickness at its middle than at its end portions. Making the elastic layer have such a crown shape makes it easy for the charging member to be brought into contact with the photosensitive member at a constant pressure over the former's full length in the lengthwise direction.

Surface Layer:

The surface layer according to the present invention contains a high-molecular compound having an Si—O—Hf linkage in its molecule and having a constitutional unit represented by the following formula (1) and a constitutional unit represented by the following formula (2).

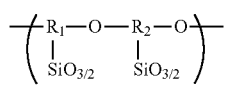
(1)

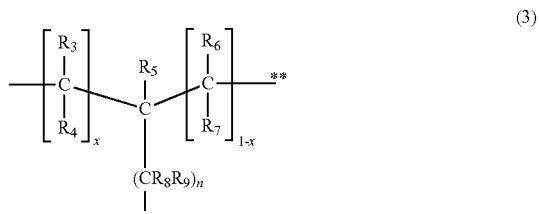

In the formula (1), $R_1$ and $R_2$ each independently represent any of structures represented by the following formulae (3) to (6).

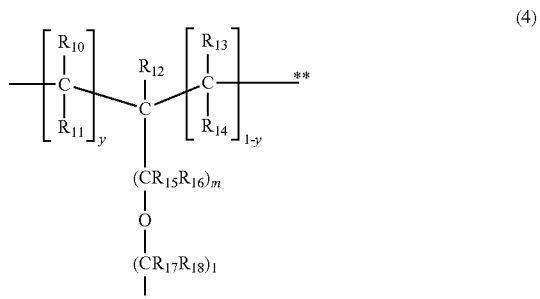

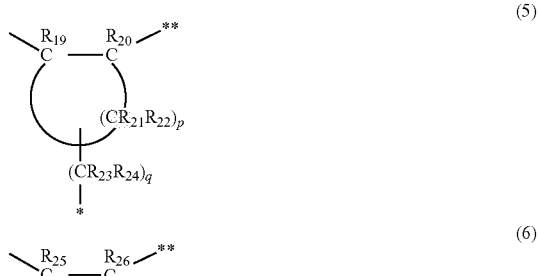

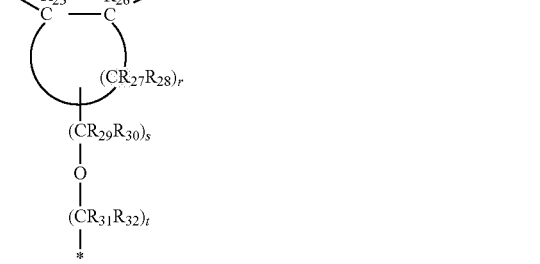

In the formulae (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group having 1 to 4 carbon atom(s) or an alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * represents the position of bonding with the silicon atom in the formula (1) and a double asterisk ** represents the position of bonding with the oxygen atom in the formula (1).

Figure 6A:
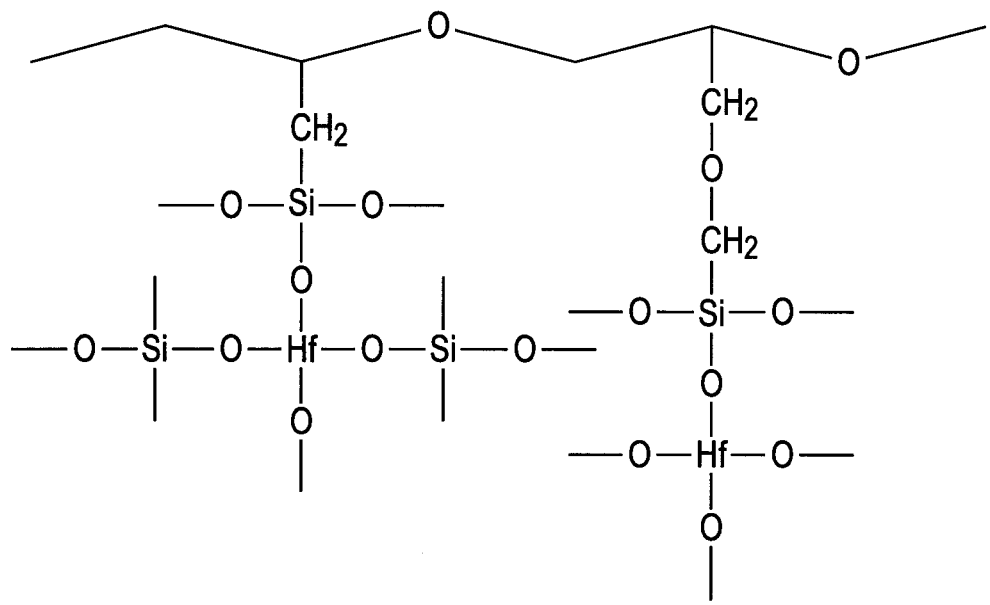
FIG. 6A is a view showing the chemical structure of a high-molecular compound according to the present invention.

As a specific example of the above high-molecular compound, it is so structured that $R_1$ in the formula (1) is the structure represented by the formula (3) and $R_2$ is the structure represented by the formula (4), part of which is shown in FIG. 6A.

Figure 6B:
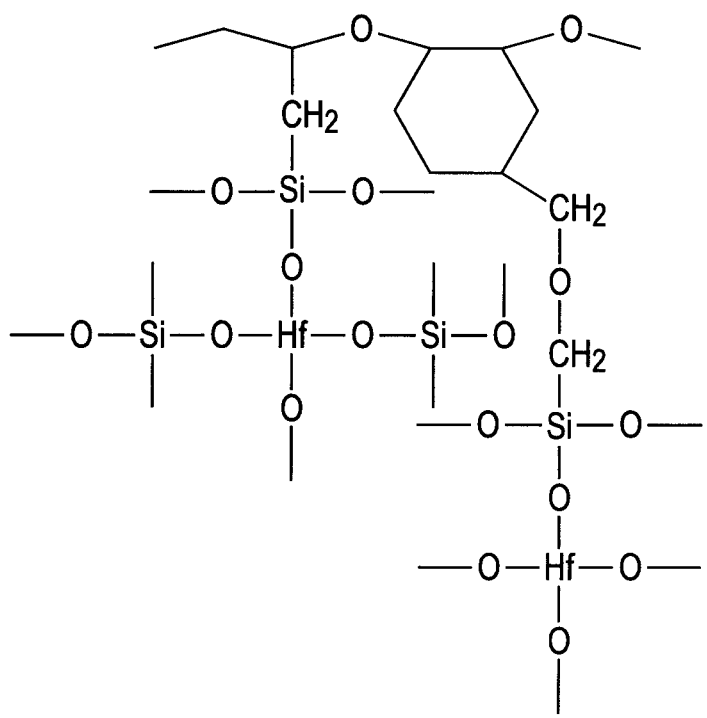
FIG. 6B is a view showing the chemical structure of a high-molecular compound according to the present invention.

As another specific example of the above high-molecular compound, it is so structured that $R_1$ in the formula (1) is the structure represented by the formula (3) and $R_2$ is the structure represented by the formula (6), part of which is shown in FIG. 6B.

More specific structures of the formulae (3) to (6) that represent $R_1$ and $R_2$ in the formula (1) may include those represented by the following formulae (7) to (10), in which $R_3$ to $R_{32}$ are each a hydrogen atom.

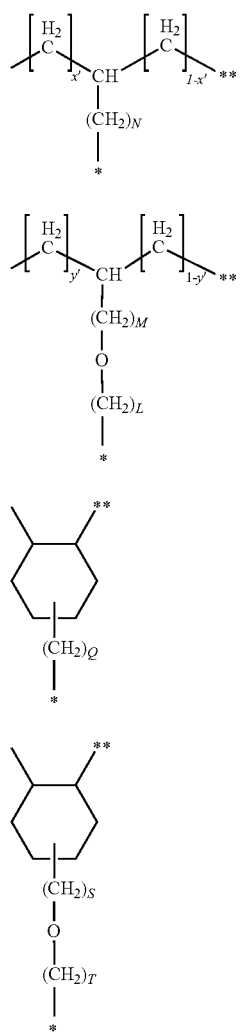

In the formulae (7) to (10), N, M, L, Q, S and T each independently represent an integer of 1 or more to 8 or less; x' and y' each independently represent 0 or 1; and an asterisk * represents the position of bonding with the silicon atom in the formula (1) and a double asterisk ** represents the position of bonding with the oxygen atom in the formula (1).

The high-molecular compound according to the present invention may be formed by hydrolyzing a hydrolyzable hafnium compound together with a hydrolyzable silane compound to obtain a hydrolyzed condensate, and then cross-linking cationic-polymerizable groups bonded to silicon atoms the condensate has. Hence, it follows that this high-molecular compound has a very high crosslink density.

In particular, the hydrolyzable hafnium compound has a higher reaction rate than the hydrolyzable silane compound at the time of the hydrolysis condensation, and hence the hydrolyzed condensate itself has a high degree of condensation to have a very dense molecular structure.

Then, the surface layer containing such a high-molecular compound can have a high hardness and a high elastic modulus that are attributable to the dense molecular structure of the high-molecular compound. Incidentally, the elastic modulus of the high-molecular compound may be controlled by selecting the content ratio of hafnium and silicon, the type and amount of organic chains bonded to the hydrolyzable silane compound, and so forth.

Now, the ratio of the number of atoms of hafnium to that of silicon, Hf/Si, which atoms are contained in the high-molecular compound may preferably be from 0.1 or more to 5.0 or less. Inasmuch as the ratio of Hf/Si is within this range of numerical values, the compound can be a high-molecular compound contributing to the formation of a surface layer that can not easily wear even due to its contact with the photosensitive member and, in addition, has at a higher level an appropriate elasticity contributing to the formation of a proper nip zone between the charging member and the photosensitive member.

Formation of Surface Layer:

Such a high-molecular compound may be obtained by allowing a hydrolyzable silane compound represented by the following formula (11) and a hydrolyzable hafnium compound represented by the following formula (12) to react with each other to obtain a hydrolyzed condensate, and thereafter forming cross-links therein. Instead, it may be obtained as a cross-linked product of a hydrolyzed condensate of the hydrolyzable silane compound represented by the formula (11), the hydrolyzable hafnium compound represented by the formula (12) and a hydrolyzable silane compound represented by the following formula (17). Such hydrolysis condensation reaction may be carried out by mixing these hydrolyzable compounds and heating the resultant mixture appropriately.

In the hydrolyzable silane compound represented by the formula (11), $R_{34}$ to $R_{36}$ each independently represent a hydrocarbon group. As the hydrocarbon group, it may be chainlike, branched or cyclic, and may have an unsaturated bond. $R_{33}$ represents any of structures having an epoxy group represented by the following formulae (13) to (16).

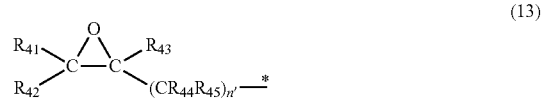

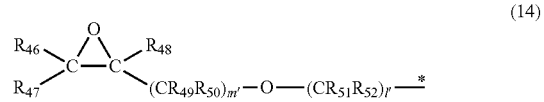

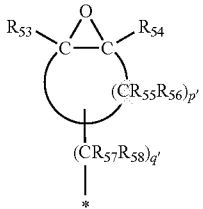

(15)

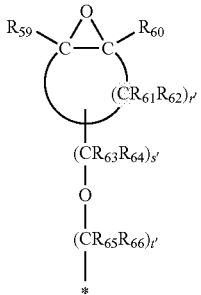

(16)

In the formulae (13) to (16), $R_{41}$ to $R_{43}$, $R_{46}$ to $R_{48}$, $R_{53}$, $R_{54}$, $R_{59}$ and $R_{60}$ each independently represent a hydrogen atom, an alkyl group having 1 to 4 carbon atom(s), a carbonyl group, a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or an alkyl group having 1 to 4 carbon atom(s); $R_{55}$, $R_{56}$, $R_{61}$ and $R_{62}$ each independently represent a hydrogen atom, an alkoxyl group having 1 to 4 carbon atom(s) or an alkyl group having 1 to carbon atom(s); n', m', q', s' and t' each independently represent an integer of 1 to 8, and p' and r' each independently represent an integer of 4 to 12; and an asterisk * represents the position of bonding with the silicon atom.

$$Hf(OR_{37})(OR_{38})(OR_{39})(OR_{40}) \quad (12)$$

Surface Layer:

In the hydrolyzable hafnium compound represented by the formula (12), $R_{37}$ to $R_{40}$ each independently represent an alkyl group having 1 to 4 carbon atom(s).

$$R_{67}\text{—}Si(OR_{68})(OR_{69})(OR_{70}) \quad (17)$$

Surface Layer:

In the formula (17), $R_{67}$ represents an alkyl group having 1 to 21 carbon atom(s) or a phenyl group, and $R_{68}$ to $R_{70}$ each independently represent an alkyl group having 1 to 6 carbon atom(s).

The high-molecular compound may be obtained as a cross-linked product by first preparing a surface layer coating material containing such a hydrolyzed condensate, coating this coating material on the elastic layer to form a coating film, and then subjecting the hydrolyzed condensate contained therein, to cross-linking reaction.

The surface layer coating material may be prepared through the following steps.

Step (1):

The hydrolyzable silane compound (A) represented by the formula (11), the hydrolyzable silane compound (B) represented by the formula (17) and the hydrolyzable hafnium compound (C) represented by the formula (12) are readied as monomers.

Step (2):

The hydrolyzable silane compound (A) and the hydrolyzable silane compound (B) are mixed, and water (D) and an alcohol (E) are added to the resultant mixture, followed by heating and reflux to effect hydrolysis condensation to obtain a condensate of the hydrolyzable silane compounds.

Step (3):

To the liquid obtained, the hydrolyzable hafnium compound (C) is added, and these are mixed to effect hydrolysis condensation to form a condensate of the hydrolyzable silane compounds and hydrolyzable hafnium compound (herein also "silane-hafnium condensate") to obtain a condensate-containing liquid.

Step (4):

To the condensate-containing liquid, a photopolymerization initiator (G) is added, and these are mixed to obtain the surface layer coating material.

In the step (2), the hydrolyzable silane compound (B) may optionally be used. Also, the hydrolyzable hafnium compound (C) may be added simultaneously with the hydrolyzable silane compound (A) and so forth, and this enables the step (3) to be saved.

The respective steps are detailed below.

Step (1):

The hydrolyzable silane compound (A) may specifically include the following, and any of these may be used alone or in combination of two or more types: 4-(1,2-Epoxybutyl)trimethoxysilane, 5,6-epoxyhexyltriethoxysilane, 8-oxysilan-2-yl-octyltrimethoxysilane, 8-oxysilan-2-yl-octyltriethoxysilane, 3-glycidoxypropyltrimethoxysilane, 3-glycidoxypropyltriethoxysilane, 1-(3,4-epoxycyclohexyl)ethyltrimethoxysilane, 1-(3,4-epoxycyclohexyl)ethyltriethoxysilane, 3-(3,4-epoxycyclohexyl)methyloxypropyltrimethoxysilane and 3-(3,4-epoxycyclohexyl)methyloxypropyltriethoxysilane.

The hydrolyzable silane compound (B) may specifically include the following, and any of these may be used alone or in combination of two or more types: Methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, hexyltripropoxysilane, decyltrimethoxysilane, decyltriethoxysilane, phenyltrimethoxysilane, phenyltriethoxysilane and phenyltripropoxysilane.

The hydrolyzable hafnium compound (C) may specifically include the following, and any of these may be used alone or in combination of two or more types: Tetraethoxyhafnium, tetra-i-propoxyhafnium, tetra-n-butoxyhafnium, tetra-t-butoxyhafnium, 2-ethylhexoyhafnium and 2-methoxymethyl-2-propoxyhafnium.

These compounds, the hydrolyzable silane compound (A), the hydrolyzable silane compound (B) and the hydrolyzable hafnium compound (C) may be used in a proportion, in molar ratio, that satisfies the following expression, formula (20):

$$0.1 \leq (C)/(A+B) \leq 5.0 \quad (20)$$

Surface Layer:

In the formula (20), A represents the number of moles of the hydrolyzable silane compound (A) represented by the formula (11) [also "hydrolyzable silane compound (A)"]. B represents the number of moles of the hydrolyzable silane compound (B) represented by the formula (17) [also "hydrolyzable silane compound (B)"]. C represents the number of moles of the hydrolyzable hafnium compound (C) represented by the formula (12) [also "hydrolyzable hafnium compound (C)"]. As long as the value of (C)/(A+B) is 0.1 or more, a surface layer improved in elasticity can be obtained. As long as it is 5.0 or less, the surface layer coating material can be kept from becoming milky or causing any precipitation. It is further preferable to satisfy the following expression, formula (21):

$$0.5 \leq (C)/(A+B) \leq 3.0 \tag{21}$$

Step (2):

As to the amount of the water (D) to be added in the step (2), it may preferably be from 0.3 or more to 6.0 or less as the ratio of the number of moles D of the water to the total number of moles (A+B) of the hydrolyzable silane compounds (A) and (B), $R_{OR}[D/(A+B)]$. $R_{OR}$ may much preferably be from 1.2 or more to 3.0 or less.

As long as $R_{OR}$ is 0.3 or more, the condensation reaction may sufficiently proceed, and any unreacted residual monomers can be kept from remaining, to obtain a film having a high crosslink density. As long as $R_{OR}$ is 6.0 or less, the condensation reaction may proceed at a high rate, and the surface layer coating material can be kept from becoming milky or causing any precipitation. In addition, it promises a high polarity to keep the compatibility of water with the condensate from lowering.

The alcohol (E) is used in order to compatibilize the silane-hafnium condensate. As the alcohol (E), it is preferable to use a primary alcohol, a secondary alcohol, a tertiary alcohol, a mixed system of a primary alcohol and a secondary alcohol, or a mixed system of a primary alcohol and a tertiary alcohol. As the alcohol, ethanol, a mixed solvent of methanol and 2-butanol or a mixed solvent of ethanol and 2-butanol is particularly preferable in view of its compatibility with the condensate and coating performance.

Step (4):

The photopolymerization initiator (G) is used in order to cross-link the silane-hafnium condensate. As the photopolymerization initiator (G), an onium salt of Lewis acid or Brø-nsted acid or a cationic polymerization catalyst may be used. A particularly preferable cationic polymerization catalyst may include a bis(4-tert-butylphenyl) iodonium salt and a compound represented by the following formula (18) (trade name: ADECAOPTOMER SP150; available from Asahi Denka Kogyo K.K.).

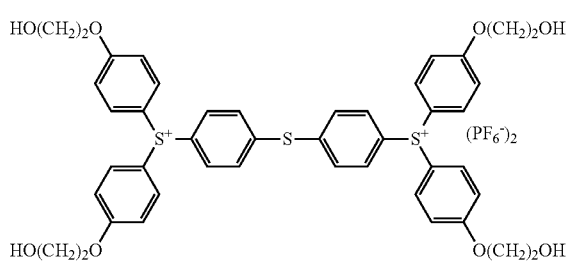

(18)

A compound represented by the following formula (19) (trade name: IRGACURE 261; available from Ciba Specialty Chemicals Inc.) may also preferably be used.

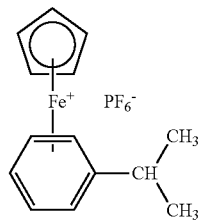

(19)

It is preferable for the photopolymerization initiator (G) to be used in the state it is beforehand dissolved in a solvent such as an alcohol or a ketone, as exemplified by methanol or isobutyl ketone, in order to improve its compatibility with the surface layer coating material. Further, the surface layer coating material is controlled to have a concentration suited for its coating performance. As a solvent to be used therefor, ethanol, a mixed solvent of methanol and 2-butanol or a mixed solvent of ethanol and 2-butanol is preferred.

As a coating method for the surface layer coating material, a method such as coating making use of a roll coater, dip coating or ring coating may be used.

The silane-hafnium condensate is cross-linked in the coating film formed by coating the surface layer coating material on the elastic layer by the above method. Cross-links may be formed by irradiating the coating film with activated-energy rays to make epoxy groups in the silane-hafnium condensate undergo cleavage and polymerization by the aid of the photopolymerization initiator (G). As the activated-energy rays, ultraviolet rays are preferable because they can produce radicals of the photopolymerization initiator (G) at a low temperature to make the cross-linking reaction proceed.

Making the cross-linking reaction proceed at a low temperature keeps any solvent from volatilizing rapidly from the coating film and keeps the coating film from causing phase separation to come to wrinkle, thus a surface layer can be formed which has a high bond strength to the elastic layer. The surface layer having a high bond strength to the elastic layer can keep itself from coming to wrinkle or crack even if the charging member is used in an environment causative of abrupt changes in temperature and humidity and the elastic layer has varied in volume because of such changes in temperature and humidity. Moreover, such a surface layer can keep the elastic layer from deteriorating thermally when the cross-linking reaction proceeds, and hence can also keep the elastic layer from lowering in its electrical properties in production steps.

As a radiation source for the ultraviolet rays, a high-pressure mercury lamp, a metal halide lamp, a low-pressure mercury lamp, an excimer UV lamp or the like may be used. Of these, preferred is one which radiates ultraviolet rays of from 150 nm or more to 480 nm or less in wavelength. The irradiation with ultraviolet rays may be made under control of radiation quantity by selecting irradiation time, lamp output, and distance between the lamp and the irradiation object. The radiation quantity may also be sloped within the irradiation time.

Figure 5:
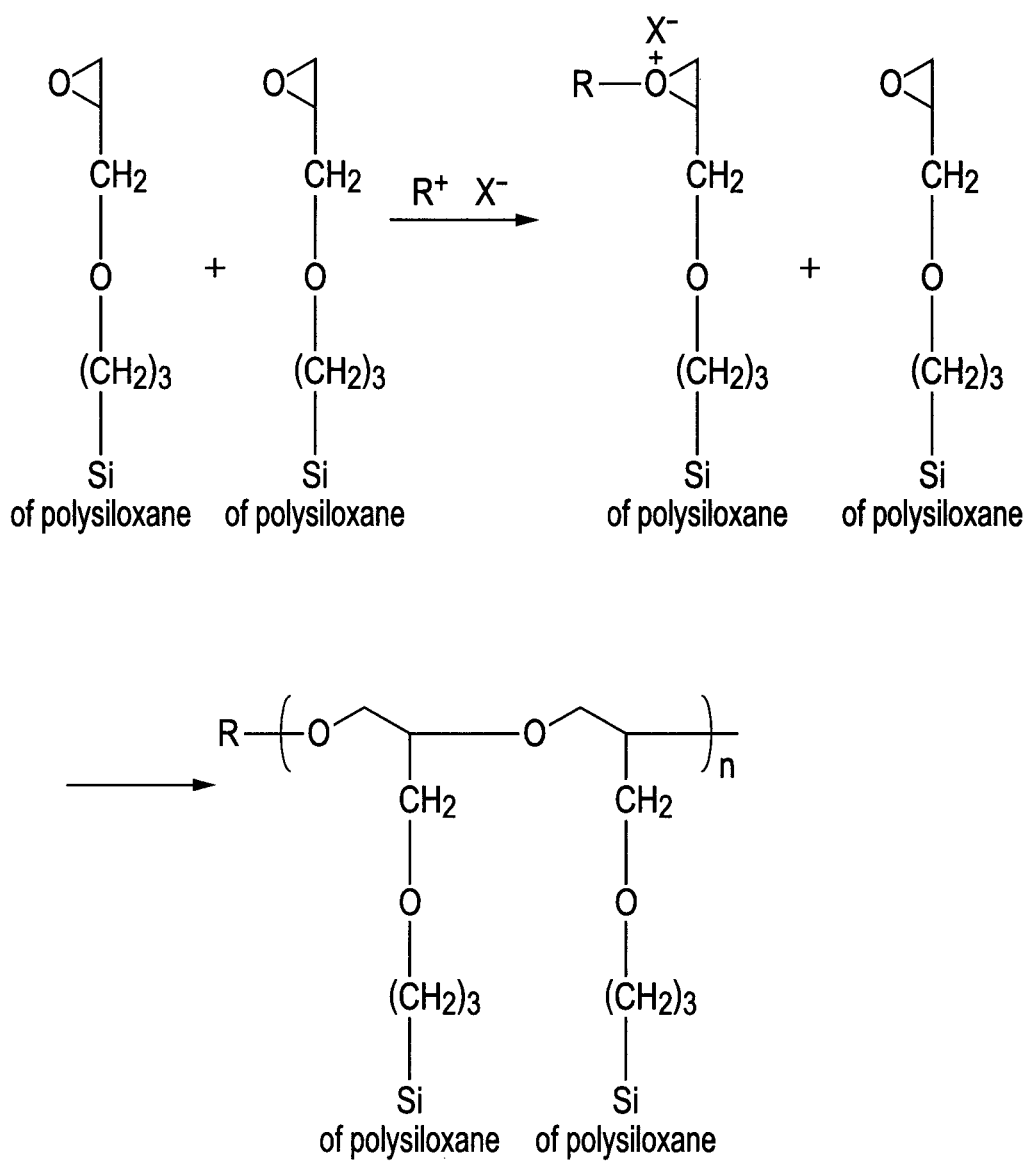
FIG. 5 is an illustration of cross-linking reaction in the step of forming a surface layer according to the present invention.

About the cross-linking reaction that takes place in the course where the high-molecular compound according to the present invention is formed, it is described with reference to FIG. 5. For example, in a condensate obtained by hydrolyzing 3-glycidoxypropyltrimethoxysilane as the hydrolyzable silane compound (A) described previously and the hydrolyzable hafnium compound (C), epoxy groups undergo ring-opening in the presence of a cationic polymerization catalyst (represented as R⁺X⁻ in FIG. 5), and the polymerization proceeds chain-reactingly. As the result, polysiloxane chains containing $HfO_{4/2}$ cross-link one another to come cured, thus the high-molecular compound according to the present invention is formed. In FIG. 5, n represents an integer of 1 or more.

The surface layer thus formed may have a thickness of approximately from 10 nm or more to 100 nm or less. The surface layer may also preferably have an elastic modulus of from 0.7 GPa or more to 50.0 GPa or less, and much preferably from 2.0 GPa or more to 35.0 GPa or less. This enables the surface layer to be more improved in resistance to scraping against it, and also to form a sufficient nip zone between the charging member and the photosensitive member.

Figure 2:
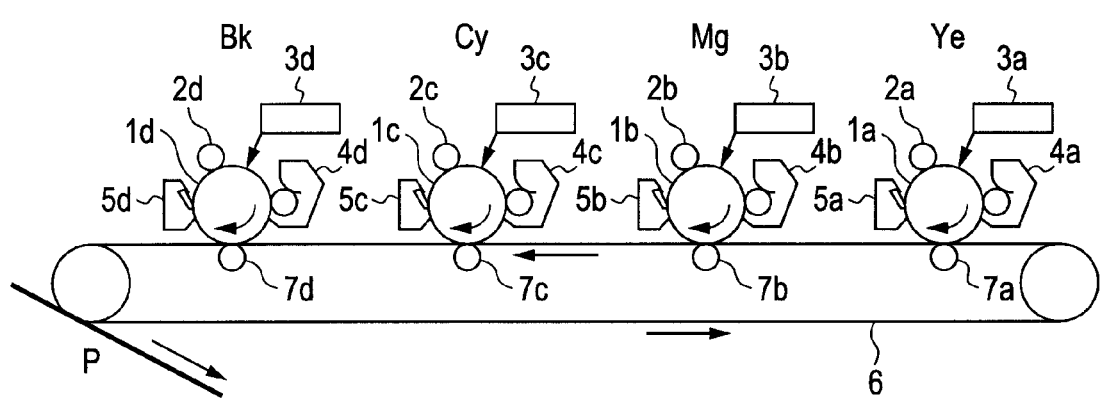
FIG. 2 is a structural view of an example of an electrophotographic apparatus employing the charging member of the present invention.

Image forming apparatus and process cartridge:

An example of the electrophotographic apparatus according to the present invention is shown in FIG. 2 as a structural view. Drum-shaped electrophotographic photosensitive members (hereinafter "photosensitive members") $1a$ to $1d$ set opposite to developing means $4a$ to $4d$ holding therein yellow, magenta, cyan and black toners, respectively, are provided in a line in the direction of movement of an intermediate transfer belt 6. The photosensitive members $1a$ to $1d$ each have a support having an electrical conductivity and provided thereon a photosensitive layer containing an inorganic or organic photosensitive material, and are each optionally provided with a charge injection layer or the like for charging each photosensitive member to stated polarity and potential. The photosensitive members are provided around them with charging members charging rollers $2a$ to $2d$, exposure means $3a$ to $3d$ and cleaning means $5a$ to $5d$. Transfer rollers $7a$ to $7d$ are also provided opposite to the photosensitive members $1a$ to $1d$, interposing the intermediate transfer belt 6 between them.

How image formation is operated is described next. The photosensitive members $1a$ to $1d$ are rotatingly driven in the directions shown by arrows and at a stated peripheral speed (process speed). The charging rollers $2a$ to $2d$ are brought into contact with the photosensitive members, and are rotatingly driven in the directions following the rotation of the photosensitive members, during which a stated DC voltage, e.g., −1,050 V is applied to each charging roller from a charging bias applying power source. Thus, the surfaces of the photosensitive members $1a$ to $1d$ are uniformly electrostatically charged to stated polarity and potential (dark-area potential of −450 V).

The surfaces of the photosensitive members $1a$ to $1d$ having been thus charged are irradiated by the exposure means $3a$ to $3d$ with laser beams modulated in accordance with image data sent from a host processing unit such as a personal computer, to effect imagewise exposure, whereupon the potential at exposed areas attenuates, so that electrostatic latent images corresponding to the respective colors are formed on the respective photosensitive members. Toners standing charged to the same polarity as the charge polarity of the photosensitive members are fed to the photosensitive members by the developing means $4a$ to $4d$, whereupon the toners adhere selectively to the electrostatic latent images, thus the electrostatic latent images are rendered visible as the toner images.

The transfer rollers $7a$ to $7d$ are pressed against the photosensitive members $1a$ to $1d$ at a stated pressing force, interposing the intermediate transfer belt 6 between them, and are rotated at substantially the same speed as the photosensitive members, during which a transfer voltage with a polarity reverse to that of charge characteristics of the toners is applied to each transfer roller from a transfer bias applying power source. Thus, respective-color toner images are sequentially superimposedly transferred to the intermediate transfer belt 6 at the respective transfer positions, so that a full-color toner image is formed thereon.

The full-color toner image formed on the intermediate transfer belt 6 is transferred all together to a transfer material P which is fed at a stated timing by a paper feed means (not shown) and come transported by a transport means. The full-color toner image on this transfer material P is fused by heating by means of a fixing assembly (not shown) and permanently fixed onto the transfer medium, thus the desired full-color print image is reproduced.

Meanwhile, toners remaining on the photosensitive members after the toner images have been transferred to the intermediate transfer belt 6 are collected by cleaning blades, and the photosensitive members come to stand ready for the next image formation.

Here, the above electrophotographic apparatus is so set up that, not only the full-color mode that forms full-color toner images by using four-color toners, but also a monochrome mode that forms black-and-white images by using only the photosensitive member for black toner can be chosen and can be switched from the former. The apparatus may also be so designed that a difference in speed is put between the peripheral speed of the photosensitive members and the peripheral speed of the intermediate transfer belt so as to improve the efficiency of transfer of the toner images from the photosensitive members to the intermediate transfer belt and prevent any blank-area phenomenon in the four-color mode to obtain good images free of any color tint variations. Here, the blank-area phenomenon refers to a phenomenon that the toner images transferred from the photosensitive members to the intermediate transfer belt have blank areas unwantedly.

The process cartridge of the present invention is a process cartridge in which any photosensitive member and the charging member described above are disposed in contact with each other and integrally supported and which is so made as to be detachably mountable to the main body of the electrophotographic apparatus. As an example thereof, a cartridge (not shown) is available in which the photosensitive member and the charging member are integrally supported with a support member such as a resin molded product and which is so set up as to be detachably mountable to the main body of the electrophotographic apparatus as it is so integrally set up. The process cartridge may also be a process cartridge in which, in addition to the photosensitive member and the charging roller, the developing means and the cleaning means are also integrally supported together.

EXAMPLES

The present invention is described below in greater detail by giving specific working examples. In what are given below, "part(s)" refers to "part(s) by mass".

Example 1

Formation of Elastic Layer

Components shown in Table 1 below were mixed by means of a 6-liter pressure kneader (TD6-15MDX; manufactured by Toshin Co., Ltd.) for 24 minutes in a packing of 70 vol. % and at a number of blade revolutions of 30 rpm to obtain an unvulcanized rubber composition.

TABLE 1

| | |
|---|---|
| Medium/high-nitrile NBR (trade name: NIPOL DN219; bound acrylonitrile content center value: 33.5%; Mooney viscosity center value: 27; available from Nippon Zeon Co., Ltd.) | 100 parts |
| Carbon black for color (filler) (trade name: TOKA BLACK #7360SB; particle diameter: 28 nm; nitrogen adsorption specific surface area: 77 m$^2$/g; DBP oil absorption: 87 cm$^3$/100 g; available from Tokai Carbon Co., Ltd.) | 48 parts |
| Calcium carbonate (filler) (trade name: NANOX #30; available from Maruo Calcium Co., Ltd.) | 20 parts |
| Zinc oxide | 5 parts |
| Stearic acid | 1 part |

To 174 parts by mass of this unvulcanized rubber composition, 4.5 parts of tetrabenzylthiuram disulfide (trade name: SANCELER TBzTD; available from Sanshin Chemical Industry Co., Ltd.) as a vulcanization accelerator and 1.2 parts of sulfur as a vulcanizing agent were added. Then, these were mixed by means of an open roll of 12 inches in roll diameter at a number of front-roll revolutions of 8 rpm and a number of back-roll revolutions of 10 rpm and at a roll gap of 2 mm, carrying out right and left 20 cuts in total. Thereafter, the roll gap was changed to 0.5 mm to carry out tailing (tight milling) 10 times to obtain a kneaded product I for elastic layer.

Next, a support (substrate) made of steel (one having been surface-plated with nickel) in a columnar shape of 6 mm in diameter and 252 mm in length was readied. Then, this support was coated with a metal- and rubber-containing heat-hardening adhesive (trade name: METALOC U-20, available from Toyokagaku Kenkyusho Co., Ltd.) over the areas up to 115.5 mm on the both sides interposing the middle of the column surface in the axial direction (the area of 231 mm in total width in the axial direction). The wet coating thus formed was dried at 80° C. for 30 minutes, and thereafter further dried at 120° C. for 1 hour.

The kneaded product I was extruded simultaneously with the above support (mandrel) with adhesive layer while being shaped coaxially around the mandrel and in the shape of a cylinder of 8.75 mm to 8.90 mm in diameter, by extrusion making use of a cross head. The extruded product obtained was cut at its end portions to produce an elastic roller 1 the mandrel of which was covered on the outer periphery thereof with an unvulcanized elastic layer. As an extruder, an extruder having a cylinder diameter of 70 mm and an L/D of 20 was used, making temperature control to 90° C. for its head, 90° C. for its cylinder and 90° C. for its screw at the time of extrusion.

Next, the above roller was put to vulcanization by using a continuous heating oven having two zones set at different temperatures. A first zone was set at a temperature of 80° C., where the roller was passed therethrough in 30 minutes, and a second zone was set at a temperature of 160° C. and the roller was passed therethrough also in 30 minutes, to obtain a vulcanized elastic roller 2.

Next, the elastic roller 2, standing before surface grinding, was cut at its both ends of the elastic layer portion (rubber portion) to make the elastic layer portion have a width of 232 mm in the axial direction. Thereafter, the surface of the elastic layer portion was sanded with a rotary grinding wheel (number of work revolutions: 333 rpm; number of grinding wheel revolutions: 2,080 rpm; sanding time: 12 seconds). Thus, an elastic roller 3 (elastic roller having been surface-sanded) was obtained which had a crown shape of 8.26 mm in diameter at end portions and 8.50 mm in diameter at the middle portion, having a surface ten-point average roughness (Rz) of 5.5 μm, having a run-out of 18 μm and having an Asker-C hardness of 73 degrees.

The ten-point average roughness (Rz) was measured according to JIS B 0601 (1994).

The run-out was measured with a high-precision laser measuring instrument LSM-430V, manufactured by Mitutoyo Corporation. Stated in detail, the outer diameter was measured with the measuring instrument, and the difference between a maximum outer diameter value and a minimum outer diameter value was regarded as outer-diameter difference run-out. This measurement was made at five spots, and an average value of outer-diameter difference run-out at five spots was regarded as the run-out of the measuring object.

The Asker-C hardness was measured in a measurement environment of 25° C./55% RH under conditions of a load of 1,000 g, bringing a loaded needle of an Asker-C hardness meter (manufactured by Koubunshi Keiki Co., Ltd.) into touch with the surface of the measuring object.

Preparation of Surface Layer Coating Material:

Synthesis 1

Components shown in Table 2 below were mixed, and thereafter stirred at room temperature for 30 minutes. Subsequently, heating and reflux were carried out at 120° C. for 20 hours by using an oil bath, to obtain a hydrolyzed condensed silane compound.

TABLE 2

| | |
|---|---|
| Glycidoxypropyltrimethoxysilane (GPTMS, hereinafter shown as EP-1) (hydrolyzable silane compound; trade name: KBM-403; available from Shin-Etsu Chemical Co., Ltd.) | 11.56 g (0.049 mol) |
| Hexyltrimethoxysilane (HeTMS, shown as He in Table) (hydrolyzable silane compound; trade name: KBM-3063; available from Shin-Etsu Chemical Co., Ltd.) | 62.11 g (0.301 mol) |
| Ethanol (guaranteed; available from Kishida Chemical Co., Ltd.) | 91.87 g |
| Ion-exchanged water | 11.34 g |

The hydrolyzed condensed silane compound obtained had a theoretical solid content (the mass ratio of a polysiloxane polymer to solution total weight when the hydrolyzable silane compound was assumed to have undergone dehydration condensation in its entirety) of 28.0% by mass. $R_{OR}$ at his point was 1.8.

Synthesis 2

Next, to 61.74 g of the hydrolyzed condensed silane compound ("HCSC" in Table)), having been cooled to room temperature, 115.06 g (0.224 mol) of hafnium n-butoxide (available from Gelest, Inc.; hereinafter simply "Hf-1") was added as a hydrolyzable hafnium compound. These were stirred at room temperature for 3 hours to obtain a condensate of the hydrolyzed and condensed silane compound and hydrolyzable hafnium compound (hereinafter shown as "condensate 1-1").

A sequence of stirring was carried out at 750 rpm. Also, the value of Hf/Si of the condensate 1-1 was 2.0.

Next, to 25 g of the condensate 1-1, 0.7 g of a methanol 10% by mass solution of an aromatic sulfonium salt (trade name: ADECAOPTOMER SP-150; available from Asahi Denka Kogyo K.K.) as a cationic polymerization initiator was added. The product obtained is designated as a condensate 1-2.

Evaluation 1

About the condensate 1-1, its liquid external appearance after leaving for a day to a month was compared with that immediately after synthesis to make evaluation according to the following criteria. The results are shown in Table 4.

A: The condensate stands neither milky nor precipitating even after its leaving for a month.
B: The condensate comes to stand a little milky after its leaving for about two weeks.
C: The condensate comes to stand a little milky after its leaving for about one week.
D: The condensate comes to stand milky or precipitating during its synthesis.

Evaluation 2

A cured film of the condensate 1-2 was formed, and its elastic modulus was measured. In order to remove any influence of the elastic layer, the cured film was formed on an aluminum sheet in the following way. The condensate 1-2 was diluted with a mixed solvent of ethanol and 2-butanol (ethanol:2-butanol=1:1) in such a way as to have a theoretical solid content of 7.0% by mass. The dilute solution obtained was dropped onto an aluminum sheet of 100 µm in thickness, having been degreased with a ketone or an alcohol, and spin-coated thereon by using a coating equipment 1H-D7 (manufactured by Mikasa Co., Ltd.), where the spin coating was carried out under conditions of a number of revolutions of 300 rpm and a revolution time of 2 seconds to form a coating.

After the coating formed was dried, this was irradiated with ultraviolet rays of 254 nm in wavelength by using a low-pressure mercury lamp (manufactured by Harison Toshiba Lighting Corporation) and in such a way as to be in an integral light quantity of 9,000 mJ/cm$^2$) to make the condensate 1-1 undergo cross-linking and come cured to produce a cured film having a layer thickness of 10 µm or more.

About the cured film obtained, the measured value found when, using a surface film physical properties tester (FISCHER SCOPE H100V; manufactured by Fischer Instruments K.K.), an indenter for measuring the elastic modulus was penetrated from the surface of the measuring object at a rate of 0.5 µm/7 seconds was taken as the elastic modulus. The results are shown in Table 4.

Evaluation 3

Figure 3:
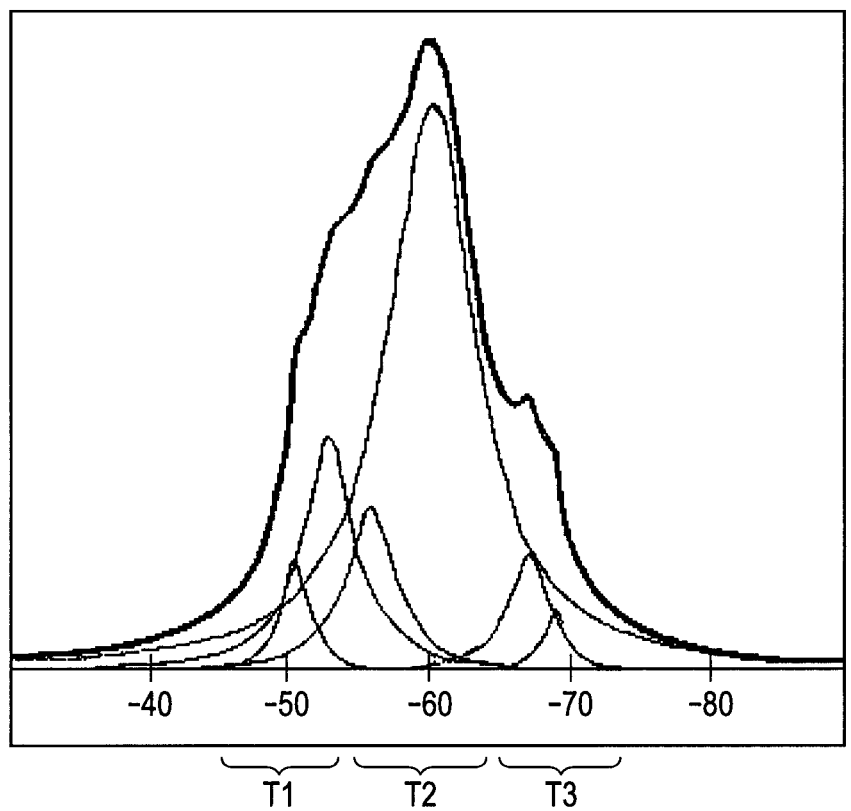
FIG. 3 is a chart showing a $^{29}$Si-NMR spectrum of an example of the charging member of the present invention.
Figure 4:
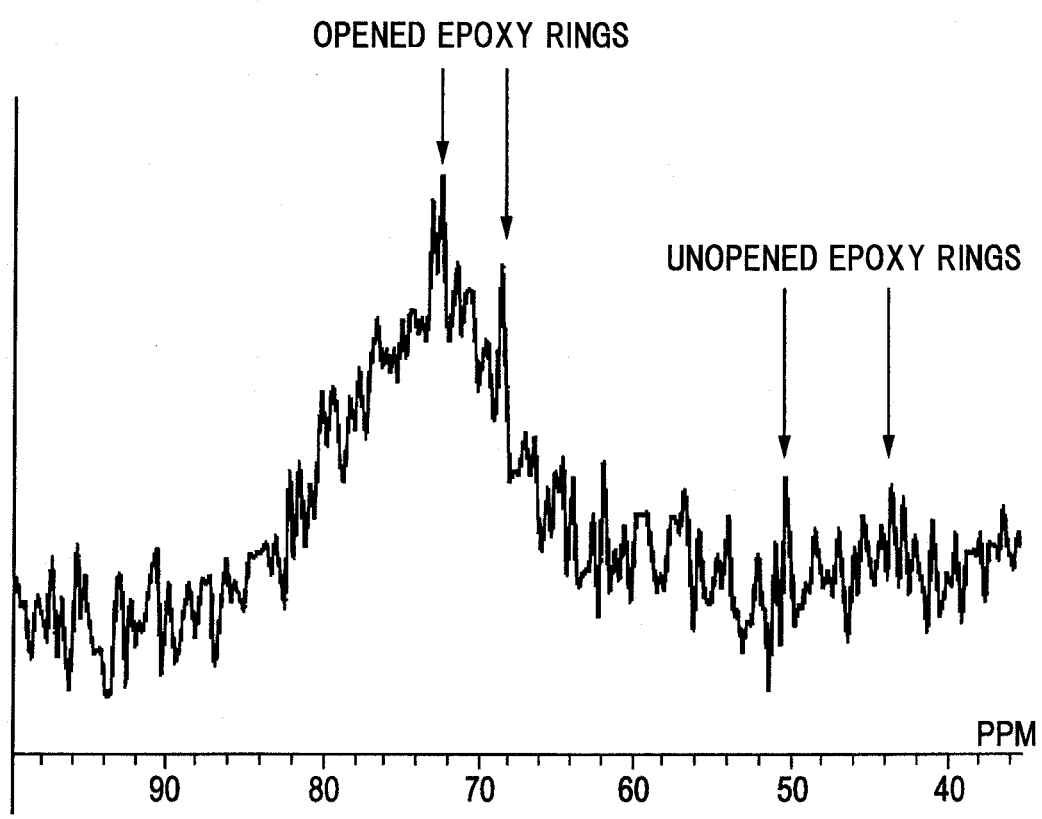
FIG. 4 is a chart showing a $^{13}$C-NMR spectrum of an example of the charging member of the present invention.

The presence of the —SiO$_{3/2}$ constitutional unit in the cured film of the condensate 1-2 produced in Evaluation was detected by using a nuclear magnetic resonance instrument (JMN-EX400, manufactured by JEOL Ltd.). The cured film of the condensate 1-2 produced in Evaluation 2 was peeled from the aluminum sheet and then pulverized. The pulverized product obtained was used as a sample for the measurement. This measuring sample was measured by $^{29}$Si-NMR to confirm the presence of the —SiO$_{3/2}$ constitutional unit. A $^{29}$Si-NMR spectrum obtained is shown in FIG. 3. The sample was also measured by $^{13}$C-NMR to confirm that any epoxy groups were not present. A $^{13}$C-NMR spectrum obtained is shown in FIG. 4. From the foregoing, it was confirmed that, in the cured film of the condensate 1-2, all the epoxy groups in the raw-material of glycidoxypropyltrimethoxysilane underwent ring-opening and cross-linking and also that the product had the —SiO$_{3/2}$ constitutional unit in the formula (1). This Evaluation 3 was likewise confirmable in Examples given later.

Formation of Surface Layer:

The condensate 1-2 was diluted with a mixed solvent of ethanol and 2-butanol (ethanol:2-butanol=1:1) in such a way as to have a solid content of 3.0% by mass, to prepare a surface layer coating material 1. Next, the elastic roller 3 was coated on its elastic layer with the surface layer coating material 1 by ring coating (ejection rate: 0.120 ml/s; speed of ring head: 85 mm/s; total delivery: 0.130 ml).

The coating film of the surface layer coating material 1 on the elastic layer was irradiated with ultraviolet rays of 254 nm in wavelength in such a way as to be in an integral light quantity of 9,000 mJ/cm$^2$) to cure the coating film of the surface layer coating material 1 to form a surface layer to obtain a charging roller 1. In the irradiation with ultraviolet rays, a low-pressure mercury lamp (manufactured by Harison Toshiba Lighting Corporation) was used. The charging roller 1 obtained was evaluated on the following.

Evaluation 4

The external appearance of the surface of the charging roller 1 was visually observed to evaluate the coating performance of the surface layer coating material 1 according to the following criteria.

A: Any faulty coating is not seen at all on the surface of the charging roller.
B: Faulty coating has occurred on some part of the surface of the charging roller.
C: Faulty coating has occurred on the whole area of the surface of the charging roller.

Evaluation 5

The presence of the Si—O—Hf linkage in the surface layer of the charging roller 1 was identified by using an X-ray photoelectron analyzer (ESCA) (QUANTUM 2000, manufactured by Ulvac-Phi, Inc.). The roller surface was irradiated with X-rays to detect linkages in the surface layer. The presence of the Si—O—Hf linkage was identified from an O1s spectrum detected. This Evaluation 5 was likewise confirmable in Examples given later.

Evaluation 6

The charging roller 1 was set in a process cartridge, which was then mounted to a laser beam printer (trade name: HP Color Laser Jet 4700 Printer; manufactured by Hewlett-Packard Co.) for A4-size sheet lengthwise printing. Using this printer, electrophotographic images were formed on 10,000 sheets, and subsequently a solid image was formed on one sheet.

Here, the electrophotographic images reproduced were those in which 4-point size letters of alphabet "E" were so printed on the A4-size sheet as to be 1% in print percentage. Also, the electrophotographic images were formed in a normal-temperature and normal-humidity environment (temperature 25° C./humidity 50% RH) and at a process speed of 164 mm/s. Further, the electrophotographic images were formed in what is called an intermittent mode. That is, it is a mode in which the photosensitive member is rotated for 10 seconds without forming any images, at intervals of continuous reproduction of electrophotographic images on 2 sheets.

The formation of electrophotographic images in such an intermittent mode comes to a larger number of times of friction between the charging roller and the photosensitive member than a case in which electrophotographic images are continuously formed, and hence this can be severer evaluation for the evaluation on wear of the charging member.

About the above solid images, whether or not any white vertical line-shaped non-uniformity due to non-uniform charging caused by the wear of the surface of the charging roller was seen, and how much it was, were observed to make evaluation according to the following criteria.

A: Any non-uniformity is not seen.
B: Slight non-uniformity is seen in some part of the images.
C: Non-uniformity is seen in some part of the images.
D: Clear non-uniformity is seen over the whole area of the images.

Evaluation 7

The charging roller was detached from the process cartridge on which Evaluation 6 was finished. The surface of this charging roller was washed with water, and the surface having been washed was visually observed to make evaluation according to the following criteria, on whether or not the surface wore and how much it did.
A: Any wear is not seen.
B: Slight wear is seen only at roller end portions.
C: Wear is seen only at roller end portions.
D: Wear is seen over the whole area of the roller.

Examples 2 to 32

Condensates were prepared in the same way as Example 1 except that the raw materials to be used were changed for those shown in Table 3. The products were evaluated in the same way. Charging rollers were also produced in the same way as Example 1 except that the respective condensation products were used. The rollers were evaluated in the same way. The $R_{OR}$ and the value of Hf/Si are shown in Table 3, and the results of evaluation in Table 5. About hydrolyzable silane compounds and hydrolyzable hafnium compounds for which the symbols represent in Table 3, their specific structures and manufacturers are shown in Table 4.

Comparative Example 1

A condensate was prepared in the same way as Example 1 except that the raw materials to be used were formulated as shown in Table 6 and that any hydrolyzable hafnium compound was not used. The product was evaluated in the same way. A charging roller was also produced in the same way as Example 1 except that this condensate was used. The roller was evaluated in the same way.

Comparative Example 2

A condensate was prepared without use of any hydrolyzable silane compound, and by mixing a hydrolyzable hafnium compound, water and ethanol on formulation shown in Table 6 and stirring the resultant mixture at room temperature for 3 hours, and was evaluated. A charging roller was also produced in the same way as Example 1 except that this condensate was used. The roller was evaluated in the same way.

TABLE 3

| | Amount (g) | | | | | | | | | | | | |
|---|---|---|---|---|---|---|---|---|---|---|---|---|---|
| | Synthesis 1 | | | | | | | | Synthesis 2 | | | | |
| | Hydrolyzable silane compound of formula (11) | | | | Hydrolyzable silane compound of formula (17) | | | | | Hydrolyzable hafnium compound of formula (12). | | | |
| Example: | EP-1 | EP-2 | EP-3 | EP-4 | He | Ph | Water | EtOH | HCSC | Hf-1 | Hf-2 | Hf-3 | $R_{OR}$ | Hf/Si |
| 1 | 11.56 | — | — | — | 62.11 | — | 11.34 | 91.87 | 61.74 | 115.06 | — | — | 1.80 | 2.00 |
| 2 | 11.56 | — | — | — | 62.11 | — | 11.34 | 91.87 | 73.07 | — | 103.73 | — | 1.80 | 2.00 |
| 3 | 11.56 | — | — | — | 62.11 | — | 11.34 | 91.87 | 52.95 | — | — | 123.85 | 1.80 | 2.00 |
| 4 | 11.56 | — | — | — | 62.11 | — | 11.34 | 91.87 | 120.61 | 56.19 | — | — | 1.80 | 0.50 |
| 5 | 11.56 | — | — | — | 62.11 | — | 11.34 | 91.87 | 46.58 | 130.22 | — | — | 1.80 | 3.00 |
| 6 | 11.56 | — | — | — | 62.11 | — | 11.34 | 91.87 | 161.73 | 15.07 | — | — | 1.80 | 0.10 |
| 7 | 9.14 | — | — | — | 64.65 | — | 11.40 | 91.59 | 31.08 | 145.72 | — | — | 1.80 | 5.00 |
| 8 | 16.31 | — | — | — | 57.04 | — | 11.19 | 92.27 | 169.02 | 7.78 | — | — | 1.80 | 0.05 |
| 9 | 6.68 | — | — | — | 67.21 | — | 11.47 | 91.30 | 26.54 | 150.26 | — | — | 1.80 | 6.00 |
| 10 | 69.97 | — | — | — | — | — | 9.61 | 97.26 | 68.55 | 108.25 | — | — | 1.80 | 2.00 |
| 11 | 12.16 | — | — | — | — | 76.07 | 11.92 | 76.80 | 29.98 | 146.82 | — | — | 1.80 | 5.00 |
| 12 | 9.63 | — | — | — | — | 79.37 | 12.02 | 75.88 | 25.53 | 151.27 | — | — | 1.80 | 6.00 |
| 13 | — | 9.84 | — | — | 64.95 | — | 11.86 | 90.27 | 59.96 | 116.84 | — | — | 1.80 | 2.00 |
| 14 | — | 77.18 | — | — | — | — | 13.02 | 86.38 | 56.23 | 120.57 | — | — | 1.80 | 2.00 |
| 15 | — | 10.38 | — | — | — | 79.69 | 12.49 | 74.35 | 28.83 | 147.97 | — | — | 1.80 | 5.00 |
| 16 | — | — | 75.97 | — | — | — | 7.73 | 93.07 | 166.24 | 10.56 | — | — | 1.80 | 0.10 |
| 17 | — | — | 20.83 | — | 53.98 | — | 10.59 | 91.39 | 64.48 | 112.32 | — | — | 1.80 | 2.00 |
| 18 | — | — | 14.98 | — | 59.63 | — | 10.89 | 91.12 | 32.26 | 144.54 | — | — | 1.80 | 5.00 |
| 19 | — | — | 15.74 | — | — | 72.97 | 11.44 | 76.75 | 161.61 | 15.19 | — | — | 1.80 | 0.10 |
| 20 | — | — | 8.82 | — | 65.69 | — | 11.21 | 90.96 | 62.15 | 114.65 | — | — | 1.80 | 2.00 |
| 21 | — | — | 8.82 | — | 65.69 | — | 16.82 | 85.35 | 31.51 | 145.29 | — | — | 2.70 | 5.00 |
| 22 | — | — | 11.95 | — | 62.63 | — | 11.05 | 91.06 | 27.40 | 149.40 | — | — | 1.80 | 6.00 |
| 23 | — | — | — | 24.50 | 47.89 | — | 10.74 | 93.71 | 162.46 | 14.34 | — | — | 1.80 | 0.10 |
| 24 | — | — | — | 46.27 | — | 30.09 | 10.14 | 90.31 | 163.20 | 13.60 | — | — | 1.80 | 0.10 |
| 25 | — | — | — | 12.56 | — | 75.25 | 11.79 | 77.33 | 168.63 | 8.17 | — | — | 1.80 | 0.05 |
| 26 | — | — | — | 68.74 | — | — | 9.04 | 98.97 | 170.46 | 6.34 | — | — | 1.80 | 0.05 |
| 27 | — | — | — | 68.74 | — | — | 9.04 | 98.97 | 164.57 | 12.23 | — | — | 1.80 | 0.10 |
| 28 | — | — | — | 11.93 | 61.40 | — | 11.21 | 92.11 | 62.15 | 114.65 | — | — | 1.80 | 2.00 |
| 29 | — | — | — | 9.46 | 64.10 | — | 11.31 | 91.83 | 31.29 | 145.51 | — | — | 1.80 | 5.00 |
| 30 | — | — | — | 57.55 | 12.05 | — | 4.73 | 102.30 | 170.18 | 6.62 | — | — | 0.90 | 0.05 |
| 31 | — | — | — | 6.938 | 66.83 | — | 11.4 | 91.533 | 26.67 | 150.13 | — | — | 1.80 | 6.00 |
| 32 | 5.75 | — | — | 6.002 | 61.76 | — | 11.28 | 91.992 | 61.94 | 114.86 | — | — | 1.80 | 2.00 |

TABLE 4

| Compound name | Structural formula | Manufacturer |
|---|---|---|
| EP-1 3-glycidoxypropyltrimethoxysilane | (epoxide)–CH$_2$–O–(CH$_2$)$_3$–Si(OMe)$_3$ | Shin-Etsu Chemical |

TABLE 4-continued

| | Compound name | Structural formula | Manufacturer |
|---|---|---|---|
| EP-2 | 4-(1,2-epoxybutyl)trimethoxysilane | (epoxy)-(CH$_2$)$_2$-Si(OMe)$_3$ | Carbone Scientific |
| EP-3 | 8-oxysilan-2-yl-octyl-trimethoxysilane | (epoxy)-(CH$_2$)$_8$-Si(OMe)$_3$ | SiKEMIA |
| EP-4 | 1-(3,4-epoxycyclohexyl)ethyl trimethoxysilane | (epoxycyclohexyl)-CH$_2$-Si(OMe)$_3$ | Shin-Etsu Chemical |
| He | Hexyl-trimethoxysilane | Me-(CH$_2$)$_5$-Si(OMe)$_3$ | Shin-Etsu Chemical |
| Ph | Phenyl-triethoxysilane | (phenyl)-Si(OEt)$_3$ | Shin-Etsu Chemical |
| Hf-1 | Hafnium n-butoxide | Hf-[O(n-C$_4$H$_9$)]$_4$ | Gelest |
| Hf-2 | Hafnium ethoxide | Hf-(OEt)$_4$ | Gelest |
| Hf-3 | Hafnium 2-methoxymethyl-2-propoxide | Hf-(—O—C(CH$_3$)$_2$CH$_2$OCH$_3$)$_4$ | Gelest |

Me: methyl group; Et: ethyl group

TABLE 5

| | | Evaluation | | | |
|---|---|---|---|---|---|
| Example | 1 | 2 Elastic modulus (GPa) | 4 | 6 | 7 |
| 1 | A | 17.10 | A | A | A |
| 2 | A | 14.52 | A | A | A |
| 3 | A | 13.31 | A | A | A |
| 4 | A | 3.45 | A | B | B |
| 5 | A | 29.79 | A | A | B |
| 6 | A | 0.52 | A | C | C |
| 7 | B | 34.34 | A | A | B |
| 8 | A | 0.73 | A | C | C |
| 9 | C | 39.96 | B | A | B |
| 10 | A | 35.10 | B | A | B |
| 11 | B | 39.22 | A | A | B |
| 12 | C | 45.62 | A | B | B |
| 13 | A | 20.20 | A | A | B |
| 14 | A | 39.25 | A | A | B |
| 15 | B | 36.43 | A | A | B |
| 16 | A | 17.11 | A | B | B |
| 17 | A | 10.02 | A | B | B |
| 18 | B | 15.60 | A | A | B |
| 19 | A | 0.59 | A | C | C |
| 20 | A | 7.13 | A | B | C |
| 21 | B | 7.43 | A | C | C |
| 22 | C | 16.69 | B | B | C |
| 23 | A | 6.84 | A | B | B |
| 24 | A | 12.57 | A | B | B |
| 25 | A | 10.91 | A | B | B |
| 26 | A | 20.09 | A | B | B |
| 27 | A | 25.52 | A | B | B |
| 28 | A | 40.02 | A | A | A |
| 29 | B | 41.86 | A | A | A |

TABLE 5-continued

| | | Evaluation | | | |
|---|---|---|---|---|---|
| Example | 1 | 2 Elastic modulus (GPa) | 4 | 6 | 7 |
| 30 | A | 15.06 | A | B | C |
| 31 | C | 42.27 | B | C | C |
| 32 | A | 37.51 | A | A | A |

TABLE 6

| Comparative Example | He | Hf-1 | Synthesis Amount (g) Water | EtOH | $R_{OR}$ | Hf/Si |
|---|---|---|---|---|---|---|
| 1 | 74.29 | — | 41.99 | 60.32 | 1.00 | — |
| 2 | — | 110.52 | 3.96 | 62.27 | — | — |

TABLE 7

| | | Evaluation | | | |
|---|---|---|---|---|---|
| Comparative Example | 1 | 2 Elastic modulus (GPa) | 4 | 6 | 7 |
| 1 | D | * | B | D | D |
| 2 | D | 153 | C | D | C |

* Not measured because of faulty curing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-215808, filed on Sep. 27, 2010, which is herein incorporated by reference as part of this application.

What is claimed is:

1. A charging member, comprising:
a substrate;
an elastic layer; and
a surface layer,
wherein:
the surface layer comprises a compound having an Si—O—Hf linkage; and
the compound has a constitutional unit represented by the following formula (1) and a constitutional unit represented by the following formula (2):

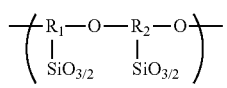

(1)

(2)

where, in the formula (1), $R_1$ and $R_2$ each independently represent any of structures represented by the formulae (3) to (6):

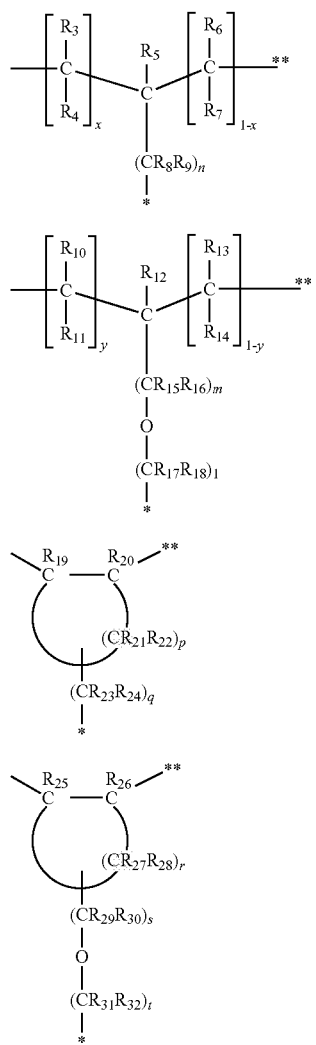

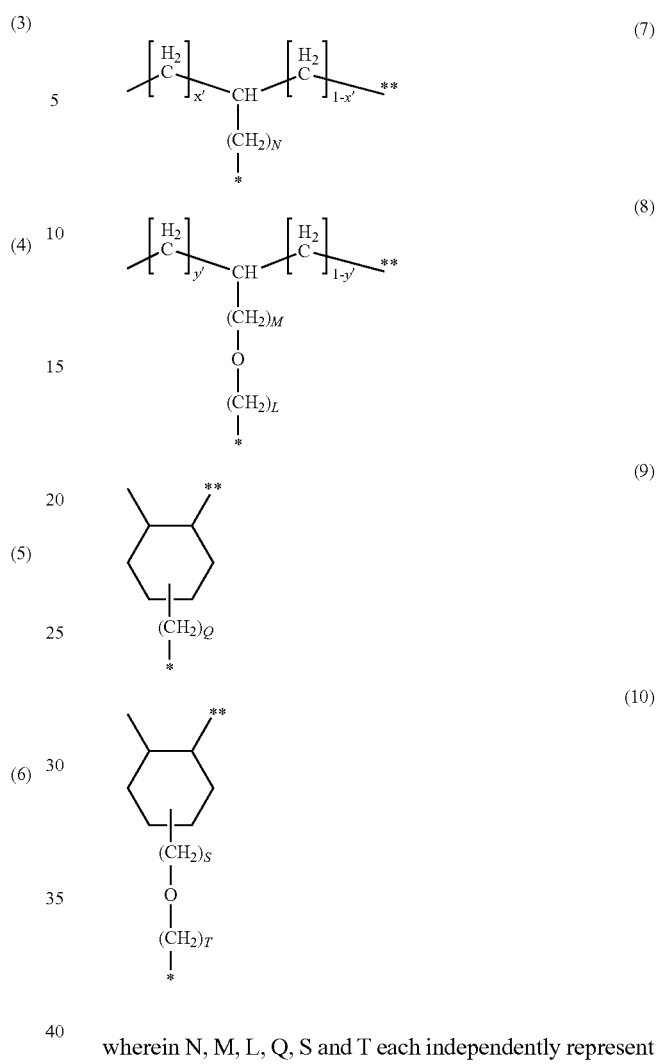

where, in the formulae (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group having 1 to 4 carbon atom(s) or an alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * represents the position of bonding with the silicon atom in the formula (1) and a double asterisk ** represents the position of bonding with the oxygen atom in the formula (1).

2. The charging member according to claim 1, wherein $R_1$ and $R_2$ in the formula (1) is any of structures represented by the formulae (7) to (10):

wherein N, M, L, Q, S and T each independently represent an integer of 1 to 8; x' and y' each independently represent 0 or 1; and an asterisk * represents the position of bonding with the silicon atom in the formula (1) and a double asterisk ** represents the position of bonding with the oxygen atom in the formula (1).

3. The charging member according to claim 1, wherein, in the compound, the ratio of the number of atoms of hafnium to that of silicon, Hf/Si, is from 0.1 or more to 5.0 or less.

4. The charging member according to claim 1, wherein the compound is a cross-linked product of a hydrolyzed condensate of a hydrolyzable silane compound represented by the formula (11) and a hydrolyzed condensate of a hydrolyzable hafnium compound represented by the formula (12):

   (11)

   (12)

where, in the formula (11), $R_{33}$ represents any of structures represented by the formulae (13) to (16); $R_{34}$ to $R_{36}$ each independently represent an alkyl group having 1 to 4 carbon atom(s); and, in the formula (12), $R_{37}$ to $R_{40}$ each independently represent an alkyl group having 1 to 4 carbon atom(s):

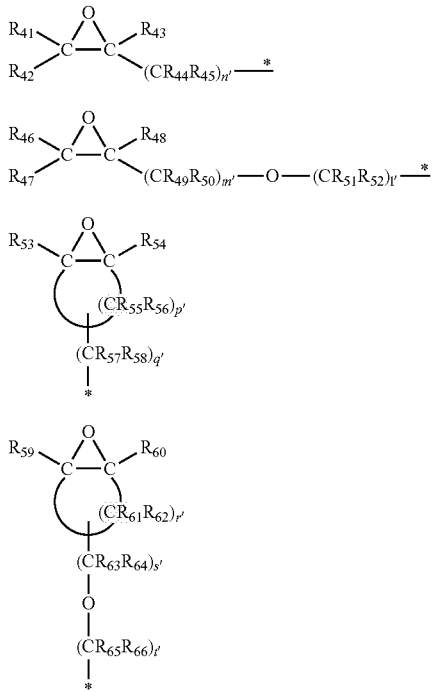

(13)
(14)
(15)
(16)

where, in the formulae (13) to (16), $R_{41}$ to $R_{43}$, $R_{46}$ to $R_{48}$, $R_{53}$, $R_{54}$, $R_{59}$ and $R_{60}$ each independently represent a hydrogen atom, an alkyl group having 1 to 4 carbon atom(s), a carbonyl group, a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or an alkyl group having 1 to 4 carbon atom(s); $R_{55}$, $R_{56}$, $R_{61}$ and $R_{62}$ each independently represent a hydrogen atom, an alkoxyl group or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom.

5. The charging member according to claim 4, wherein the compound is a cross-linked product of the hydrolyzable silane compound represented by the above formula (11), the hydrolyzable hafnium compound represented by the above formula (12) and a hydrolyzable silane compound represented by the formula (17):

(17)

where, in the formula (17), $R_{67}$ represents an alkyl group having 1 to 21 carbon atom(s) or a phenyl group, and $R_{68}$ to $R_{70}$ each independently represent an alkyl group having 1 to 6 carbon atom(s).

6. An electrophotographic apparatus, comprising:
an electrophotographic photosensitive member; and
the charging member according to claim 1, disposed in contact with the electrophotographic photosensitive member.

7. A process cartridge, comprising:
an electrophotographic photosensitive member; and
the charging member according to claim 1, disposed in contact with the electrophotographic photosensitive member,
wherein the process cartridge is formed to be detachably mountable to a main body of an electrophotographic apparatus.

* * * * *